United States Patent Office 3,253,049
Patented May 24, 1966

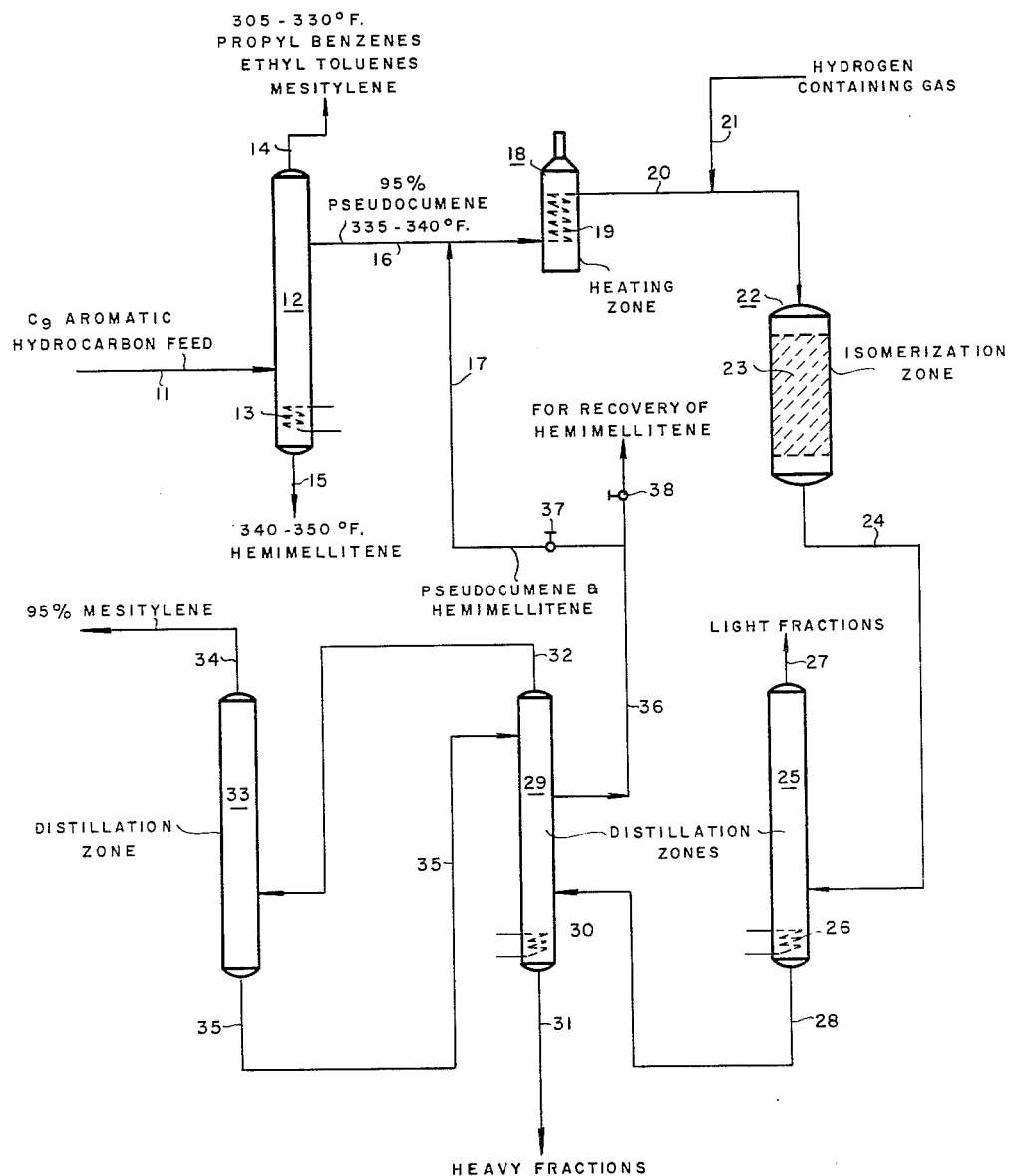

3,253,049
PRODUCTION OF MESITYLENE
David M. Allen and Donald R. Riggs, Baytown, Tex., and Thomas M. Newsom, New York, N.Y., assignors, by mesne assignments, to Esso Research and Engineering Company, Elizabeth, N.J., a corporation of Delaware
Filed Jan. 14, 1963, Ser. No. 251,361
2 Claims. (Cl. 260—668)

The present invention is directed to a method for producing mesitylene. More particularly, the invention is concerned with producing high purity mesitylene from an aromatic hydrocarbon fraction. In its more specific aspects, the invention is concerned with the isomerization of pseudocumene to mesitylene.

The present invention may be briefly described as a method for producing mesitylene, which is 1,3,5-trimethyl benzene, in which an aromatic hydrocarbon fraction containing ethyl toluene, propyl benzene, and 1,2,4- and 1,3,5-trimethyl benzene is fractionally distilled under conditions to separate a first fraction containing propyl benzene, ethyl toluene, and 1,3,5-trimethyl benzene, and a second fraction containing 1,2,4-trimethyl benzene, commonly called pseudocumene. The second fraction is isomerized in the presence of a chlorine containing platinum catalyst and hydrogen under conditions to form a product containing 1,3,5-trimethyl benzene. The 1,3,5-trimethyl benzene is recovered by distilling the product.

In the isomerization step of the present invention, temperatures in the range from about 850° to about 975° F. are employed. Preferably, a temperature of 950° F. is used, and isomerization pressures may range from about 200 to about 350 pounds per square inch gauge, with a preferred range of pressure from about 225 to about 300 pounds per square inch gauge.

The hydrocarbon feed is charged at a rate of about 0.5 to about 5 weight of feed per hour per weight of catalyst. Preferably, a w.h.w. of about 3 is used.

Hydrogen is employed in an amount of about 1 to about 5 mols of hydrogen per mol of hydrocarbon. It is preferred to use about 3 mols of hydrogen per mol of hydrocarbon.

The catalyst employed is chlorine treated platinum supported on alumina ($Al_2O_3$). The catalyst may suitably contain from about 0.05 to about 1.0 weight percent of platinum. The amount of chlorine may suitably range from about 0.3 to about 1.0 percent by weight.

A particularly important feature of the present invention is the feed stock selection. Although substantial amounts of mesitylene are present in the feed stock of the present invention, this mesitylene is not separable by distillation in substantial purity because the feed stock contains certain other alkyl benzenes other than trimethyl benzenes which have boiling points very close to the boiling point of mesitylene. Pseudocumene, by virtue of its boiling point, is separable from the feed stock of the present invention in 95 percent or greater purity. By separating a pseudocumene fraction containing substantially only methyl substituted aromatic hydrocarbons and pseudocumene, such a feed stock may then be isomerized to form mesitylene, or 1,3,5-trimethyl benzene. Besides the mesitylene which is formed by the isomerization, the other two trimethyl benzenes may also be formed but these trimethyl benzenes are separable by fractional distillation. Thus, in accordance with the present invention, the feed stock is suitably fractionated to form a fraction which contains substantially only methyl substituted aromatic hydrocarbons and pseudocumene. Stating this otherwise, the feed to the isomerization step may not contain substantial quantities of alkyl substituted benzenes other than the methyl substituted benzenes since the presence of ethyl toluenes limits purity in the final product.

The isomerization conditions as set out herein supra are carefully selected since there are several competing reactions which force methyl substituent rearrangement on the benzene ring. Besides the methyl shift on the ring, methyl groups shift to other molecules to produce all of the possible methyl benzenes. Cracking and rearrangement may also occur to produce alkyl benzenes other than methyl benzenes, as well as unsaturated materials, non-aromatics, condensed fractions, and gases. The several competing reactions do not have the same sensitivity to temperature, hydrogen concentration, pressure, residence time, and the catalyst used. The conditions employed in the present invention are selected such that all of the several competing reactions produce substantial conversion to mesitylene without excessive feed stock degradation and do not produce sufficient of the competing products to render the mesitylene inseparable from the isomerized product by distillation. Thus, the isomerization conditions must be carefully controlled to obtain the desired product.

The feed stock of the present invention is an aromatic hydrocarbon fraction suitably boiling within the range from about 300° to about 350° F. This aromatic hydrocarbon fraction is a fraction containing o-ethyl and p-ethyl toluene, 1,2,3-, 1,3,5- and 1,2,4-trimethyl benzene, propyl and isopropyl benzene. The several $C_9$ aromatic hydrocarbon compounds have boiling points as shown in the following table.

TABLE I

| $C_9$ Aromatic: | Boiling point, °F. |
|---|---|
| Isopropyl benzene | 306.3 |
| Propyl benzene | 318.5 |
| m-Ethyl toluene | 323.6 |
| p-Ethyl toluene | 324.4 |
| 1,3,5-trimethyl benzene | 328.2 |
| o-Ethyl toluene | 328.6 |
| 1,2,4-trimethyl benzene | 336.6 |
| 1,2,3-trimethyl benzene | 349 |
| Indan | 350.8 |

A typical feed stock employed in the present invention has a composition as set out below in Table II.

TABLE II

| Component: | Weight percent |
|---|---|
| $C_8$ and lighter aromatics | 1.19 |
| $C_9$ hydrocarbons | |
| Isopropylbenzene | 0.53 |
| n-Propyl benzene | 4.77 |
| m-Ethyl toluene | 16.01 |
| p-Ethyl toluene | 7.90 |
| 1,3,5 trimethyl benzene | 7.05 |
| o-Ethyl toluene | 8.42 |
| 1,2,4 trimethyl benzene | 38.07 |
| 1,2,3 trimethyl benzene | 7.57 |
| Indan | 1.80 |
| $C_{10}$ and heavier aromatics | 3.14 |
| Olefins | 0.15 |
| Saturates | 3.40 |

The present invention will be further illustrated by reference to the drawing in which the single figure is a flow diagram of a preferred mode.

Refering now to the drawing, numeral 11 designates a charge line by way of which a $C_9$ aromatic hydrocarbon feed is introduced into a distillation zone 12 from a source not shown. Distillation zone 12 is provided with a heating means illustrated by steam coil 13 and with line 14 by way of which an overhead fraction is obtained, and line 15 by way of which a bottoms fraction is discharged. Zone 12 may be a single high efficiency fractional distillation column or a plurality of distillation columns equipped with suitable internal contacting means such as bell cap trays and with other auxiliary equipment such as cooling and condensing means, and means for inducing reflux. It is understood that zone 12 includes all appurtenances necessary for obtaining precise distillation.

A fraction boiling from about 305° to about 330° F. and including propyl benzenes, ethyl toluenes, and mesitylene originally contained in the feed fraction is removed by line 14 and may be suitably further processed as desired. For example, the fraction removed by line 14 may be subjected to alkylation treatment in the presence of an alkylation catalyst such as clay or aluminum chloride. A tertiary alkylation agent such as isobutylene may be used to alkylate selectively the ethyl toluenes and propyl benzenes for recovery of mesitylene by further distillation.

The bottoms fraction removed by line 15 may boil from about 340° to about 350° F. and may include hemimellitene. A pseudocumene fraction containing at least about 95 percent pseudocumene and boiling in the range of about 335° to about 340° F. is withdrawn by line 16 admixed with a recycle fraction introduced by line 17 and then introduced into a heating zone 18 which may suitably be a gas fired furnace. While zone 12 is illustrated as a single distillation tower, preferably it may be two distillation towers with the bottoms from the first tower charged to the second tower and the pseudocumene fraction of 95%+ pseudocumene recovered as a heart-cut overhead from the second tower.

On passage through the coils 19 of the heating zone 18, the pseudocumene fraction is heated and vaporized and thereafter discharged by line 20 wherein it is mixed with a hydrogen-containing gas introduced by line 21. The admixture of pseudocumene and hydrogen-containing gas is then discharged by line 20 into an isomerization zone 22 containing a bed 23 of a supported platinum on alumina catalyst containing chlorine. The reactants pass downwardly through the bed 23 under the conditions set out herein supra to achieve selective isomerization of the pseudocumene to trimethyl benzenes, particularly mesitylene. The isomerized product discharges from zone 22 by line 24 and is introduced thereby into a distillation zone 25 which is equipped with a heating means such as steam coil 26. Zone 25 is provided with all necessary equipment like zone 12. Light fractions which may be formed in zone 22 are discharged from distillation zone 25 by line 27 while the isomerized product is withdrawn by line 28 and introduced thereby into a third distillation zone 29 provided with a heating means such as steam coil 30. Zone 29 is like zones 12 and 25, and conditions are adjusted to discharge any heavy fractions formed in zone 22 by line 31. The mesitylene-containing fraction is recovered from zone 29 by line 32 and is introduced thereby intoa fourth distillation zone 33 from whence 95 percent mesitylene or better purity is recovered by line 34. The bottoms fraction from zone 33 is withdrawn by line 35 and recycled to zone 29 as reflux. Zones 29 and 33 may be a single distillation tower if desired.

There is withdrawn as a side stream from zone 29 by way of line 36 a fraction containing hemimellitene, unreacted pseudocumene, and a small quantity of mesitylene. This fraction may be recycled by line 17 to line 16 for further processing on opening valve 37. If it is desired to recover hemimellitene, the fraction in line 36 may be withdrawn by opening valve 38 and closing valve 37. The hemimellitene may be recovered by selective alkylation and fractional distillation.

It will be seen from the foregoing description taken with the drawing that the feed hydrocarbon fraction is fractionated to discard the mesitylene originally contained in the feed and to recover pseudocumene from which mesitylene may be formed selectively by isomerization, which allows the recovery of high purity mesitylene of at least about 95 percent. Thus, in accordance with the present invention, a pseudocumene fraction of a purity of at least about 95 percent and containing only methyl substituted hydrocarbons is recovered, which allows the recovery by distillation from the isomerized product mesitylene of at least 95 percent purity.

In order to illustrate the present invention further, operations were conducted where pseudocumene was isomerized by contacting same with a chlorine treated platinum on alumina catalyst in the presence of hydrogen. In the following Table III, conditions for isomerization and analyses of the feed and product are set out.

TABLE III

*Pseudocumene Isomerization*

| Catalyst | | Platinum on Alumina Chlorine Treated | | | Platinum on Alumina Chlorine Treated | | | | | |
|---|---|---|---|---|---|---|---|---|---|---|
| Run No. | | 1 | | | 2 | | | | | |
| Hrs. on Feed | | 327–332 | 338–343 | 350–355 | 5–12 | 16–19 | 24–27 | 30–31 | 36–39 | 42–43 |
| Feedstock | | Pseudo-cumene | | | Pseudo-cumene | | | | | |
| Operating Conditions: | | | | | | | | | | |
| Temperature, °F. | | 950 | 930 | 950 | 880 | 880 | 930 | 930 | 950 | 950 |
| Pressure, p.s.i.g. | | 225 | 225 | 225 | 225 | 225 | 225 | 225 | 225 | 225 |
| Feed Rate, w./h./w. | | .75 | .75 | .75 | .75 | 1.5 | 1.5 | 3.0 | 1.5 | 3.0 |
| $H_2$/HC mol Ratio | | 3/1 | 3/1 | 3/1 | 3/1 | 3/1 | 3/1 | 3/1 | 3/1 | 3/1 |
| Unit Material Balance, Wt. Percent | | 96.2 | 99.3 | 98.1 | 98.4 | 100.5 | 101.1 | 100.7 | 101.1 | 100.4 |
| Yields, Wt. Percent: | Feed | | | | | | | | | |
| $C_1$ | | 3.4 | 2.9 | 2.8 | 2.9 | 1.3 | 2.0 | 1.2 | 2.4 | 1.3 |
| $C_2$ | | .5 | .4 | .5 | 1.1 | .4 | .6 | .3 | .6 | .3 |
| $C_3$ | | .5 | .4 | .3 | .9 | .6 | .5 | .3 | .5 | .2 |
| $C_4$ | | .5 | .4 | .3 | .7 | .4 | .4 | .1 | .2 | .2 |
| $C_5$ | | .4 | .3 | .3 | .9 | .3 | .3 | .2 | .4 | .1 |
| $C_6$ P+N | | .3 | .3 | | .3 | .3 | .3 | .1 | .2 | |
| $C_7$ P+N | | | | | .6 | .3 | | .1 | .1 | .3 |
| $C_8$ P+N | | | | | .4 | .5 | .3 | .1 | | |
| $C_9$ P+N | | | | | .3 | .6 | .1 | .1 | | |
| $C_{10}$ | .6 | | | | | | | | | |
| Benzene | | .5 | .5 | .4 | .5 | .4 | .4 | .3 | .4 | .3 |
| Toluene | | 2.6 | 2.6 | 3.4 | 2.7 | 1.4 | 2.2 | 1.1 | 2.3 | 1.3 |
| Ethyl Benzene | 1.1 | .7 | 1.8 | .3 | 1.1 | .3 | .4 | .2 | .3 | .2 |
| Para Xylene | | 5.1 | 4.6 | 4.8 | 2.9 | 2.2 | 3.2 | 1.8 | 3.9 | 2.4 |
| Meta-Xylene | | 12.4 | 11.6 | 12.1 | 7.2 | 5.4 | 8.3 | 5.0 | 9.9 | 6.1 |
| Ortho-Xylene | .5 | 6.1 | 5.1 | 6.6 | 4.3 | 2.9 | 4.0 | 2.6 | 4.2 | 3.3 |
| 1,3,5-TMB [1] | .5 | 17.6 | 17.1 | 18.5 | 17.2 | 19.8 | 18.2 | 19.8 | 17.0 | 20.8 |
| Pseudo-cumene | 96.7 | 44.7 | 45.1 | 43.9 | 45.7 | 51.3 | 49.5 | 57.1 | 48.4 | 55.4 |
| 1,2,3-TMB [1] | 1.1 | 4.7 | 6.9 | 5.8 | 6.4 | 8.1 | 7.5 | 8.3 | 8.0 | 7.8 |
| N-propyl Benzene | | | | | | .3 | | | | |
| Ter.-Butyl Benezene | | | | | 3.9 | 3.3 | 1.8 | 1.3 | 1.2 | |

[1] TMB is trimethylbenzene.

From these runs it will be clear that under the conditions selected, the pseudocumene is selectively isomerized and that the mesitylene is recoverable from the product by distillation.

Additional runs were made under the conditions set out below in Table IV.

TABLE IV

*Pseudocumene run operating conditions*

| | |
|---|---|
| Feed rate, b./d. | 2,920 |
| Space velocity, # oil hr./# catalyst | 0.94 |
| Reactor temperature, °F. | 875 |
| Reactor pressure, p.s.i.g. | 255 |
| Recycle gas rate, s.c.f./bbl. | 6,450 |
| Recycle gas percent hydrogen (mol) | [1] 90 |
| Hydrogen partial pressure, p.s.i.a. | 205 |
| Hydrogen/hydrocarbon mol ratio | 3.6 |

[1] The recycle gas may contain 75%–80% hydrogen and such was used in an operation of the invention.

The yields from this operation are shown in the following Table V.

| Component | Feed, weight percent | Product, weight percent |
|---|---|---|
| Hydrogen | 0 | 1.0 |
| Nonaromatics | 0.7 | 1.2 |
| Benzene | 0 | 0.9 |
| Toluene | 0 | 1.1 |
| $C_8$ Aromatics | 0.1 | 4.3 |
| m-Ethyltoluene | 0.1 | 0.7 |
| p-Ethyltoluene | | |
| o-Ethyltoluene | 0.9 | 0.4 |
| Mesitylene | 0.8 | 15.9 |
| Pseudocumene | 96.9 | 69.1 |
| Hemimellitene | 0.3 | 5.4 |
| $C_{10}+$ Aromatics | 0.2 | 0 |
| | 100.0 | 100.0 |

Further runs were made on a pseudocumene feed stock as shown in the following table where operating conditions and yields are provided.

TABLE VI

Operating conditions:

| | |
|---|---|
| Feed rate, # oil/hr./# catalyst | 1.5 |
| Temperature, °F. | 880 |
| Pressure, p.s.i.g. | 225 |
| Hydrogen partial pressure, p.s.i.a. | 180 |
| Hydrogen/hydrocarbon ratio | 3.0 |

| Component | Feed, weight percent | Product, weight percent |
|---|---|---|
| Nonaromatics | 0.6 | 4.6 |
| Benzene | 0 | 0.4 |
| Toluene | 0 | 1.4 |
| $C_8$ Aromatics | 1.1 | 10.8 |
| Mesitylene | 0.5 | 19.8 |
| Pseudocumene | 96.7 | 51.3 |
| Hemimellitene | 1.1 | 8.1 |
| n-Propyl benzene | 0 | 0.3 |
| Ter-butyl benzene | 0 | 3.3 |
| | 100.0 | 100.0 |

It will be seen from the foregoing examples that by obtaining a high purity pseudocumene feed and isomerizing it under selected conditions, it is possible to form an isomerized product from which there is recovered by distillation a high purity mesitylene. If non-selective treatment were employed, a product similar to that from a hydroformer from which the $C_9$ aromatic hydrocarbon feed is obtained may be formed. In the practice of the present invention, mesitylene which is contaiminated with other than methyl substituents is discarded, and a pseudocumene fraction consisting essentially of pseudocumene and methyl substituted benzenes is employed as a feed to an isomerization zone such that mesitylene of high purity may be recovered by distillation.

The nature and objects of the present invention having been fully described and illustrated, and the best mode thereof set forth, what we wish to claim as new and useful and secure by Letters Patent is:

1. A method for producing 1,3,5-trimethyl benzene which comprises fractionally distilling a $C_9$ aromatic hydrocarbon fraction containing ethyl toluene, propyl benzene, and trimethyl benzenes including 1,2,4- and 1,3,5-trimethyl benzene under conditions to separate a first fraction containing said propyl benzene, ethyl toluene, and 1,3,5-trimethyl benzene and a second fraction boiling within the range of about 335° F. to about 340° F. and containing substantially only methyl substituted aromatic hydrocarbons and said 1,2,4-trimethyl benzene, said 1,2,4-trimethyl benzene being present in said second fraction in at least 95 weight percent purity, isomerizing said second fraction in the presence of a chlorine-containing alumina-supported platinum catalyst, said catalyst containing from about 0.3 to about 1.0 weight percent of chlorine and from about 0.05 to about 1.0 weight percent of platinum, and in the presence of from about 1 to about 5 mols of hydrogen per mol of said second fraction under conditions including a temperature within the range from about 850° F. to about 975° F. and a pressure within the range from about 200 to about 350 pounds per square inch gauge at about 0.5 to about 5 w./hr./w. to form a product containing 1,3,5-trimethyl benzene, and recovering at least 95 weight percent purity 1,3,5-trimethyl benzene from said product.

2. A method in accordance with claim 1 in which the 1,3,5-trimethyl benzene is recovered by distillation.

References Cited by the Examiner

UNITED STATES PATENTS

| | | | |
|---|---|---|---|
| 2,589,621 | 3/1952 | Lien et al. | 260—668 |
| 2,781,324 | 2/1957 | Haensel | 260—668 |
| 2,976,332 | 3/1961 | Leum | 260—668 |
| 3,078,318 | 2/1963 | Berger | 260—668 |

DELBERT E. GANTZ, *Primary Examiner.*

J. R. LIBERMAN, *Examiner.*

J. E. DEMPSEY, R. H. SCHUBERT,
*Assistant Examiners.*